March 22, 1927.
J. L. OLIVER
1,621,681
PISTON RING CONTRACTING TOOL
Filed June 3, 1924
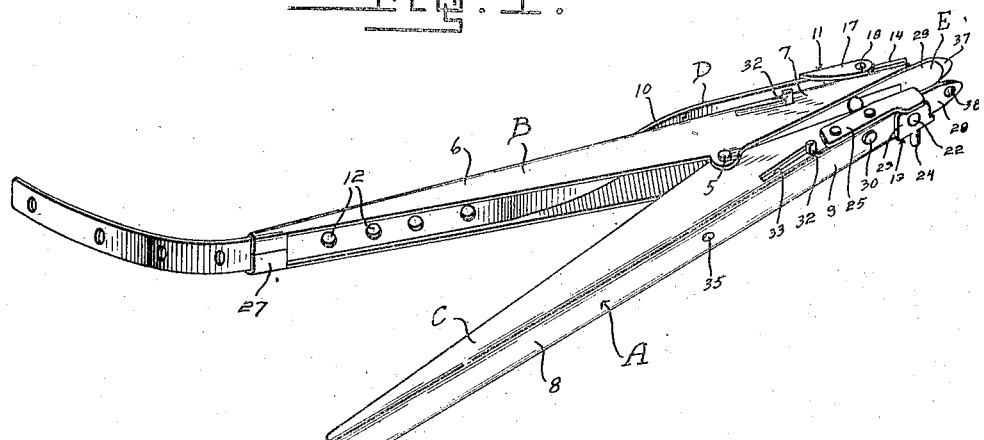
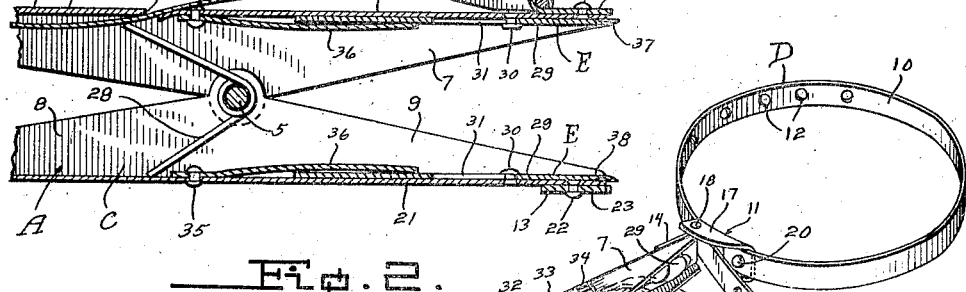
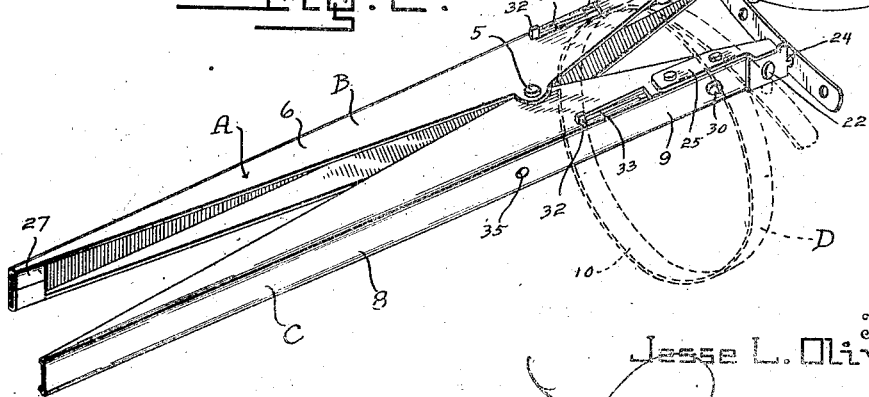
Inventor
Jesse L. Oliver Patented Mar. 22, 1927.

1,621,681

UNITED STATES PATENT OFFICE.

JESSE L. OLIVER, OF BEEVILLE, TEXAS.

PISTON-RING-CONTRACTING TOOL.

Application filed June 3, 1924. Serial No. 717,645.

The present invention relates to tools, and more specifically to an improved tool adapted for use in connection with the placing and removing of split piston rings with respect to pistons as used in internal combustion engines, compressers, or the like.

The primary object of the invention being to provide a novel piston ring tool embodying features whereby split piston rings may be readily expanded for the placing and removing thereof with respect to pistons, and embodying features whereby the rings may be contracted about a piston for enabling the easy insertion thereof within a cylinder.

Another object of the invention is to incorporate in a novel piston ring expanding tool, an adjustable band capable of being swung to various angles with respect to the pivotal member of the tool as when contracting a ring about a piston, and embodying features whereby the flexible band may be readily disposed in an out of the way position adjacent to one of the pivotal members of the tool as when using the tool for expanding a piston ring.

A still further object of the invention is to provide a novel combined piston ring expanding and contracting tool embodying no detachable parts to become lost or misplaced, and one which may be placed upon the market at a reasonable cost to the purchaser.

Other objects and advantages of the invention will appear in the following detailed description, taken in connection with the accompanying drawing, forming a part of this specification, and in which drawing;

Fig. 1 is a perspective view of the device and showing the elements in a fixed position as when used for expanding a piston ring;

Fig. 2 is a perspective view of the device showing the elements in a fixed position as when the device is used for contracting a piston ring, and showing by dotted lines the manner in which the adjustable contracting band may be disposed at a right angle to the plane of the pivotal members; and Fig. 3 is a fragmentary central longitudinal section through one end of the device showing both the contracting and expanding elements in a retracted or inoperative position.

Referring to the drawing in detail, and wherein like characters designate corresponding parts throughout the several views, A designates the improved tool comprising companion members B and C; D means for the ring contracting operation, and E co-acting means carried by the respective members B and C for the ring expanding operation.

The companion members B and C, which are preferably channel shaped in formation, are pivotally connected intermediate their ends as by a pivot 5 extending through the flanges of the channel shaped members. The member B includes a rearwardly tapered handle 6 and a forwardly tapered jaw 7; while the member C which is formed substantially as member B includes a corresponding rearwardly tapered handle 8 and a forwardly tapered jaw 9; the respective handle and jaw of each member to extend on one side of the pivot 5.

The means D for contracting a ring about a piston for enabling the easy insertion thereof into a cylinder, comprises a flexible band 10 being connected at one end to the outer end of the jaw 7 as by swivel means 11, and having its free end provided with a plurality of apertures 12 whereby the free end of the strip may be adjustably attached to the outer end of the companion jaw 9 as by retaining means 13.

The swivel means 11 comprises a hinge plate 14 which is rotatably secured to the outer face of the jaw web 15 as by a rivet 16 having its inner head countersunk and lying flush with the inner face of the web 15. One edge of the plate 14 is coiled upon itself for hingedly connecting the arms of a clevis 17 thereto as by means of a hinge pin 18 extending through the side plates or arms of the clevis. The proper end of the strip 10 is positioned between the side plates of the clevis 17 and securely fastened to the connecting plate 19 of the clevis as by a rivet 20, and it can be seen that the strip 10 will be held in proper alignment with the clevis by the side plates or arms of the clevis.

The retaining means 13 which is rotatably secured to the outer face of the web 21 of the companion jaw 9 as by a rivet 22, comprises a substantially flat square plate 23 having a centrally disposed contracting pin 24 extending from one edge thereof for insertion in any one of the apertures 12 of the strip 10. A flat spring 25, secured to one flange of the jaw 9, is adapted to have a portion of its free end overlying the plate 23 for contacting relation with the flat marginal edges of the plate for retaining the pin 24 in a desired plane with respect to the members B and C.

When not desiring to use the device for the purpose of contracting piston rings, the hinge plate 14 may be swung rearwardly, and the free end of the strip 10 threaded through a transverse slot 26 provided in the web of the member B, and then through a guide 27 formed inwardly of the free end of the handle 6; thereby disposing the strip in an "out of the way position" inwardly of the handle portions and leaving the tool ready for convenient use for the purpose of expanding piston rings.

A coil spring 28 positioned about the pivot pin 5, is adapted to have its free ends press against the inner faces of the handles 6 and 8 for normally urging the handles apart. One free end of the spring 28 will bear against the strip 10, when in an inoperative position, for aiding in retaining the strip in its adjusted position inwardly of the handle 6.

Referring to the means E for expanding a piston ring, the same preferably consists of companion ring expanding blades 29 which are slidably mounted inwardly of the respective jaws 7 and 9 by pins 30 carried by each jaw and adapted to extend through longitudinal slots 31 formed in the blades. Formed at the inner end of each blade 29 are finger engaging lugs 32 which extend outwardly through longitudinally extending inwardly inclined slots 33 provided in adjacent flanges of the jaws 7 and 9 respectively. The forward end of each slot 33 extends outwardly as at 34 for providing a lock stop whereby the expanding blades 29 may be retained in an extended operative position forwardly of the forward ends of the jaws 7 and 9. Secured at one end to the inner face of the web of each member B and C as by rivets 35, are flat leaf springs 36 the free ends of which are adapted to slidably engage their respective blades 29 for normally urging the blades outwardly against the webs of the jaws. It can be seen therefore, that when the blades 29 are slid to an extended position by the finger engaging lugs 32, the springs 36 will force the lugs 32 outwardly into the stops 34 and thereby retain the blades in an extended operative position. The blades will be retained in a retracted inoperative position by the co-action of the springs 36 and inclined slots 33. The outer ends of the blades 29 have their confronting end portions oppositely beveled as at 37 in order that when the jaws 7 and 9 are moved into a fully closed position, a sharp V-shaped end will be formed at the ends of the blades for permitting of the ready insertion thereof between the abutting ends of a piston ring to be expanded. A recess 38 is formed in the outer face of each blade 29 adjacent the outer end thereof for receiving the beveled end portions of a piston ring, in order that the ring ends will be prevented from slipping from the blades when being expanded.

It will therefore be apparent that after the blades 29 have been properly disposed between the abutting ends of a split piston ring, that movement of the handles 6 and 8 toward one another will cause the blade carrying jaws 7 and 9 to move from one another, thereby enlarging the ring for permitting of the placing or removing of the ring with respect to a piston.

When using the tool for contracting a split piston ring about a piston for permitting of the ready insertion thereof into a cylinder, the blades 29 are first retracted within the jaws 7 and 9, and the strip 10 withdrawn from its inoperative position within the handle 6. The free end of the flexible strip may then be looped and passed through the clevis 11, and attached to the contracting pin 24 for providing a loop of the desired size or diameter. When in this position, it will be seen that when drawing the handles 6 and 7 toward one another, the loop will be caused to contract, thereby contracting the piston ring and permitting of its ready insertion into a cylinder block.

The object in so mounting the contracting means D upon the members B and C, is for permitting of the flexible loop being disposed at various angles with respect to the major axis of the tool, in order that the loop may be effectively positioned about a piston where obstructions of various characters prohibit the successful operation of the device with the loop lying in a plane with the handle portions thereof.

Changes in detail may be made without departing from the spirit or scope of the invention; but,

I claim:

1. In a piston ring contracting tool, the combination of a pair of pivotally connected members, each including a handle and a jaw, a flexible strip swivelly connected at one end to the forward end of one of said jaws and having its free end provided with a plurality of spaced apart apertures, a rotatable plate having flat marginal edges carried by the forward end of the companion jaw, a lug formed on one marginal edge of said plate for engaging in any of the apertures of said strip, and resilient means for engagement with the marginal edges of said plate whereby the lug will be held at various adjusted angles with respect to the pivotally connected members.

2. A piston ring contracting tool comprising a pair of pivotally connected members, each including a rearwardly tapered handle and a forwardly tapered jaw, a flexible strip hingedly connected at one end to the forward end of one of said jaws and having its free end portion adapted for detachable engagement with the forward end of the companion jaw, said strip carrying member being provided with a transverse slot, and having a guide formed inwardly of the free end of the handle portion thereof whereby the free end of the strip may be fed through the slot and guide for providing a compact tool when not being used, and spring means associated with the pivoted members for normally urging the handle portions thereof to a spread position 3. In a piston ring contracting tool, the combination of a pair of pivotally connected members, a hinge plate rotatably carried by the forward end of one of the members, a retaining means rotatably carried by the forward end of the companion member, and a looped strip operatively connected with said rotatable hinge plate and with said rotatable retaining means for movement in a plane parallel to the longitudinal axis of the pivotally connected members or in a plane in angular relation to the axis of the latter.

4. In a piston ring contracting tool, the combination of a pair of pivotally connected members, a hinge plate rotatably carried by the forward end of one of the members, a retaining means rotatably carried by the forward end of the companion member, and a looped strip hingedly connected at one end to said rotatable hinge plate and adjustably connected with the rotatable retaining means whereby the loop may be disposed with its axis at various angles with respect to the major axis of the pivotally connected members.

JESSE L. OLIVER.